United States Patent Office 3,594,384
Patented July 20, 1971

---

3,594,384
PHARMACOLOGICALLY-ACTIVE TRIMETHOXY-BENZOXYALKYL-PIPERAZINO [1'] COMPOUNDS
Adolf Stachel, Frankfurt am Main, Fechenheim, Rudi Beyerle, Bruchkobel, and Rolf-Eberhard Nitz and Klaus Resag, Frankfurt am Main, Fechenheim, Germany, assignors to Cassela Farbwerke Mainkur Aktiengesellschaft, Frankfurt am Main, Germany
No Drawing. Filed Oct. 7, 1968, Ser. No. 765,692
Claims priority, application Germany, Oct. 12, 1967,
P 16 70 478.2
Int. Cl. C07d 51/70
U.S. Cl. 260—268CN                     6 Claims

ABSTRACT OF THE DISCLOSURE

The present invention relates to pharmacologically-active α-piperazinophenylacetonitrile derivatives having the structural formula

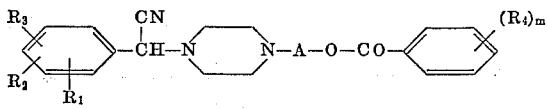

wherein $R_1$, $R_2$ and $R_3$ may be hydrogen, halogen or alkoxy groups, where $R_4$ is an alkoxy group, where $m$ may be either 1, 2 or 3, and where A is a straight or branched chain alkylene radical containing 2–4 carbon atoms, by reacting in a conventional manner an α-piperazinophenylacetonitrile having the structural formula

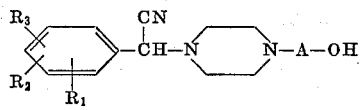

with an acid halide of an alkoxybenzoic acid having the structural formula

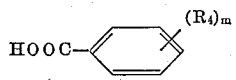

an acid-binding agent being used, if desired.

---

It has been discovered, in accordance with the present invention, that coronary dilators showing a positive inotropic effect superior to previously known coronary dilators can be produced by reacting, in the presence of an acid-binding agent, if desired, an α-piperazinophenylacetonitrile having the structural formula

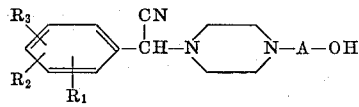

where $R_1$, $R_2$ and $R_3$ is either hydrogen, halogen or alkoxy groups containing 1–4 carbon atoms; where A is a straight or branched chain alkylene radical containing 2–4 carbon atoms, with an acid halide of an alkoxybenzoic acid having the structural formula

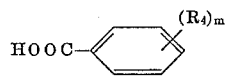

where $R_4$ is an alkoxy group containing 1–4 carbon atoms, and where $m$ may be either 1, 2 or 3.

The reaction may be carried out in any conventional manner but preferably the reactants dissolved in an indifferent organic solvent are slowly mixed at room temperature with stirring and then heated to reflux for several hours, preferably in the presence of an acid-binding agent, such as sodium carbonate. The recovered reaction products have the structural formula

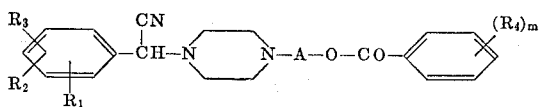

The salts of the above compounds are colorless, crystalline substances which are readily soluble in water.

The following specific examples will illustrate the method of producing the above-designated α-piperazinophenylacetonitrile derivatives. It will be understood, however, that the described methods may be varied in a manner which will be obvious to one skilled in the art without departing from the basic concept of the disclosed invention as covered by the appended claims.

EXAMPLE 1

28 grams (0.1 mol) of α-(4'-β-hydroxyethyl-piperazino[1']-4-chlorophenylacetonitrile were dissolved in 200 ml. of water-free benzene containing 10.6 grams (0.1 mol) of sodium carbonate. To this was then added, drop by drop, at room temperature, while stirring, a solution of 23 grams (0.1 mol) of 3,4,5-trimethoxybenzoyl chloride dissolved in 100 ml. of benzene. The resulting mixture was then refluxed for 2 hours while stirring. After cooling, the reaction mixture was then washed repeatedly with water. After drying over calcium chloride, hydrogen chloride gas was passed into the solution until the latter became acid to Congo Red. In this manner the dihydrochloride of the α-(4'-β-3'',4'',5''-trimethoxybenzoxyethylpiperazino[1']-4-chlorphenylacetonitrile was obtained in the form of colorless crystals which decomposed at 160° C. Yield: 45 grams, i.e. 82.5% of the theoretical.

The α - (4' - β - hydroxyethyl - piperazino[1'] - 4 - chlorophenylacetonitrile used as the starting material in this experiment was prepared as follows: 14 grams (0.1 mol) of 4-chlorobenzaldehyde were added with stirring to 30 grams of an ice-cooled solution of sodium bisulfite of 40%, by weight, concentration. After two hours there was added to this solution 13 grams (0.1 mol) of N-β-hydroxyethylpiperazine, care being taken to see that the temperature of the solution did not rise above about 30° C. When the mixing was complete the temperature of the mixture was raised to 60° C. and a solution of 7.4 grams (0.15 mol) of sodium cyanide in 20 ml. of water added drop by drop. The resulting mixture was then stirred continuously for 4 hours and the reaction product recovered in ethyl acetate. After drying over potassium carbonate the solution was evaporated to dryness in vacuo. For further purification the product was recrystallized from benzine. The α-(4'-β-hydroxyethylpiperazino[1']-4-chlorophenylacetonitrile thus obtained melted at 98° C. Yield: 23 grams, 82% of the theoretical.

In a manner analogous to the process described above, the intermediates can be prepared having the general formula

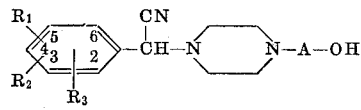

the values of $R_1$, $R_2$, $R_3$, $R_4$, $R_5$ and A and the melting points of the compounds thus produced being shown in the table following.

| 2 | 3 | 4 | 5 | 6 | A | M.P. |
|---|---|---|---|---|---|---|
| H | H | Cl | H | H | —CH$_2$CH$_2$CH$_2$— | 77° |
| H | H | Cl | H | H | —CH$_2$CH(CH$_3$)— | 55–58° |
| H | H | Cl | H | H | —CH$_2$CH$_2$CH$_2$CH$_2$— | 57–59° |
| H | H | CH$_3$O | H | H | —CH$_2$CH$_2$— | 99° |
| H | CH$_3$O | CH$_3$O | H | H | —CH$_2$CH$_2$CH$_2$— | 108° |
| H | CH$_3$O | CH$_3$O | H | H | —CH$_2$CH(CH$_3$)— | [1] 164° |
| H | CH$_3$O | CH$_3$O | H | H | —CH$_2$CH$_2$CH$_2$CH$_2$— | [1] 204° |
| CH$_3$O | CH$_3$O | CH$_3$O | H | H | —CH$_2$CH$_2$— | 98–100° |
| CH$_3$O | CH$_3$O | CH$_3$O | H | H | —CH$_2$CH$_2$CH$_2$— | [1] 173° |
| CH$_3$O | CH$_3$O | CH$_3$O | H | H | —CH$_2$CH(CH$_3$)— | [1] 170° |
| CH$_3$O | CH$_3$O | CH$_3$O | H | H | —CH$_2$CH$_2$CH$_2$CH$_2$— | [1] 165° |
| H | CH$_3$O | CH$_3$O | CH$_3$O | H | —CH$_2$CH$_2$— | 103° |
| CH$_3$O | H | H | H | CH$_3$O | —CH$_2$CH$_2$— | [1] 187° |

[1] Dihydrochloride.

EXAMPLE 2

42.2 grams (0.1 mol) of α-(4′-β-hydroxypropylpiperazino[1′])-2,3,4-trimethoxyphenylacetonitrile were dissolved in 300 ml. of anhydrous chloroform containing 10.1 grams (0.1 mol) of triethylamine. To this was then added drop by drop over a period of one hour, while stirring, 23 grams (0.1 mol) of 3,4,5-trimethoxybenzoyl chloride, dissolved in 100 ml. of anhydrous chloroform. After the exothermic reaction had subsided, the stirring was continued for a period of approximately two hours while maintaining the mixture at a temperature of 50° C. The resulting reaction mixture was then washed with water, then with a 5%, by weight, aqueous solution of sodium bicarbonate and then again with water. After drying the washed solution over anhydrous sodium sulfate it was distilled in vacuo at 50° C. The residue thus obtained was dissolved in a small amount of ethyl acetate and to the solution hydrogen chloride gas dissolved in ether added until the reaction of the solution became acid to Congo Red. The dihydrochloride of the α-(4′-β-3″,4″,5″ - trimethoxybenzoxypropylpiperazino[1′]) - 2,3,4-trimethoxyphenylacetonitrile thus obtained decomposed at 144° C. Yield: 50 grams—81% of the theoretical.

In a manner similar to those described above, compounds were prepared having the structural formula

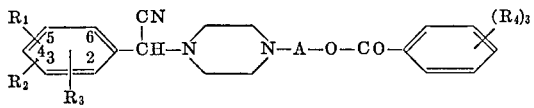

wherein the value of the various radicals is shown in the following table:

| 2 | 3 | 4 | 5 | 6 | R$_4$ | A | M.P. of dihydrochloride |
|---|---|---|---|---|---|---|---|
| H | H | Cl | H | H | 3,4,5-OCH$_3$ | —CH$_2$CH$_2$CH$_2$— | 143° |
| H | H | Cl | H | H | Same as above | —CH$_2$CH(CH$_3$)— | 112° |
| H | H | Cl | H | H | do | —CH$_2$CH$_2$CH$_2$CH$_2$— | 148° |
| H | H | CH$_3$O | H | H | do | —CH$_2$CH$_2$— | 158° |
| H | CH$_3$O | CH$_3$O | H | H | do | —CH$_2$CH$_2$CH$_2$— | 141° |
| H | CH$_3$O | CH$_3$O | H | H | do | —CH$_2$CH(CH$_3$)— | 105° |
| H | CH$_3$O | CH$_3$O | H | H | do | —CH$_2$CH$_2$CH$_2$CH$_2$— | 157° |
| CH$_3$O | CH$_3$O | CH$_3$O | H | H | do | —CH$_2$CH$_2$— | 187° |
| CH$_3$O | CH$_3$O | CH$_3$O | H | H | do | —CH$_2$CH$_2$CH$_2$— | 131° |
| CH$_3$O | CH$_3$O | CH$_3$O | H | H | do | —CH$_2$CH$_2$CH$_2$CH$_2$— | 133° |
| H | CH$_3$O | CH$_3$O | CH$_3$O | H | do | —CH$_2$CH$_2$— | 180° |
| CH$_3$O | H | H | H | CH$_3$O | do | —CH$_2$CH$_2$— | [1] 90° |
| CH$_3$O | CH$_3$O | CH$_3$O | H | H | 3,4,5-OC$_2$H$_5$ | —CH$_2$CH$_2$CH$_2$— | 148° |

[1] Decomp.

The α-piperazinophenylacetonitrile derivatives of the present invention, amongst other uses, have been found to be especially effective in the dilation of the coronary vessels and have the added advantage of showing a positive inotropic effect, thus making them superior to other known coronary dilators. This utility for this purpose was determined by the procedures customarily used for determining the suitability of compounds as coronary dilators. That is, the dilation effect was determined on the basis of the change in oxygen pressure in the blood of the coronary veins of dogs, using the method outlined by W. K. A. Schaper et al. (cf. W. K. A. Schaper, R. Xhonneux and J. M. Bogaard "The Continuous Measurement of the Oxygen Pressure in the Venous Coronary Blood," Naunyn-Schmiedeberg's Arch. Exp. Path. u. Pharmak. 245, 383–389 (1963). In accordance with this method, anesthesized, spontaneously breathing dogs were given intravenous injections of the test materials. Effective materials caused a dilation of the coronary arteries, thus producing an increase in the coronary flow of the blood and causing an increase of the oxygen pressure in the blood of the coronary veins. Changes in the oxygen pressure were measured polarographically using a platinum electrode in accordance with the method of Gleichmann-Luebbers (cf. U. Gleichmann and D. W. Luebbers, "The Measurement of the Oxygen Pressure in Gases and Liquids With the Platinum Electrode With Special Consideration to the Measurement in Blood," Pfluegers Arch. 271, 431–455

| Preparation | LD$_{50}$, g./kg. mouse | Dosage, mg./kg. i.v. | Maximum change of oxygen pressure in blood of coronary veins | | Maximum change of cardiac frequency | | Maximum change of blood pressure | |
|---|---|---|---|---|---|---|---|---|
| | | | Percent | Min. | Percent | Min. | Percent | Min. |
| α-(4′-β-3″,4″,5″-trimethoxybenzoxyethyl-piperazine [1′])-4-chlor-phenylacetonitrile | | 4.0 | +123 | >60 | −42 | >60 | −43 | 12 |
| α-(4′-β-3″,4″,5″-trimethoxybenzoxypropyl-piperazino[1′])-2,3,4-trimethoxyphenylacetonitrile | i.v.: 0.15 | 0.2 2.0 | +92 +123 | 50 >120 | −27 −23 | >50 >120 | −23 −41 | >50 15 |
| α-(4′-β-3″,4″,5″-trimethoxybenzoxyethyl-piperazino[1′])-4-methoxyphenylacetonitrile | i.v.: 0.11 | 4.0 | +81 | 40 | −22 | 50 | −47 | 20 |
| α-(4′-β-3″,4″,5″-trimethoxy-benzoxypropyl-piperazino [1′])-3,4-dimethoxyphenylacetonitrile | | 0.5 | +39 | 20 | −24 | >20 | −23 | >20 |
| α-(4′-β-3″,4″″,5″-trimethoxybenzoxyethyl-piperazino [1′])-2,3,4-trimethoxyphenylacetonitrile | i.v.: 0.11 | 0.5 2.0 | +42 +102 | 100 >90 | −15 +11 | >85 75 | −11 −47 | 45 >90 |
| α-(4′-γ-3″,4″,5″-trimethoxybenzoxypropyl-piperazino[1′])-2,3,4-trimethoxyphenylacetonitrile | i.v.: 0.1 | 2.0 | +96 | 50 | −19 | 30 | −15 | >70 |
| α-(4′-β-3″-4″-5″-trimethoxy-benzoxyethyl-piperazino[1′])-3,4,5-trimethoxyphenylacetonitrile | i.p.: 1.1 | 1.0 | +77 | 20 | +9 | >20 | −19 | 10 |
| α-(4′-β-3″,4″,5″-trimethoxybenzoxyethyl-piperazino[1′])-2,6-dimethoxy-phenylacetonitrile | | 0.5 | +68 | >15 | +4 | 15 | −13 | >15 |

(1960). The cardiac frequency was determined continuously electronically from the systolic maximums of the arterial blood pressure. The arterial blood pressure was measured by conventional methods using a Statham-strain-gauge-electromanometer in the *Arteria femoralis*.

The preceding table shows the results of tests made with a number of the α-piperazinophenylacetonitrile derivatives described above, the tests being made on the dihydrochlorides of the stated compounds:

The α-piperazinophenylacetonitrile derivatives of the present invention are conveniently used in the form of coated or uncoated tablets containing measured amounts of the said derivative which may, if desired, be combined with other active ingredients as well as with the usual tableting auxiliary agents such as starch, lactose, talcum powder and other known materials used in pill and tablet formation in the pharmaceutical industry. When used as injections, the hydrochloride derivatives of the α-piperazinophenylacetonitrile are preferred since they are usually more soluble in water than certain of the other derivatives. However, suitable injections can be prepared from water-insoluble derivatives of the α-piperazinophenylacetonitrile by employing known suspension agents, emulsifiers and/or solubilizers in accordance with procedures well known in the art.

What is claimed is:

1. α-Piperazinophenylacetonitrile compounds having the structural formula

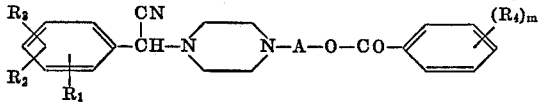

and the dihydrochlorides thereof, wherein $R_1$, $R_2$ and $R_3$ are selected from the group consisting of hydrogen, halogen or alkoxy groups having 1–4 carbon atoms, $R_4$ is an alkoxy group having 1–4 carbon atoms, A is selected from straight and branched chain alkylene groups having 2–4 carbon atoms and $m$ is selected from the integers 1, 2 and 3.

2. α-Piperazinophenylacetonitrile compounds according to claim 1 wherein the said groups are selected to give the compound α-(4′-β-3″,4″,5″-trimethoxy-benzoxy-ethyl-piperazino[1′])-4 - chlorphenylacetonitrile, and the dihydrochloride thereof.

3. α-Piperazinophenylacetonitrile compounds according to claim 1 wherein the said groups are selected to give the compound α - (4′ - β-3″,4″,5″-trimethoxy-benzoxy-propyl-piperazino[1′]) - 2,3,4 - trimethoxy-phenylacetonitrile, and the dihydrochloride thereof.

4. α-Piperazinophenylacetonitrile compounds according to claim 1 wherein the said groups are selected to give the compound α-(4′-β-3″,4″,5″-trimethoxy-benzoxyethyl-piperazino[1′])-4-methoxyphenylacetonitrile, and the dihydrochloride thereof.

5. α-Piperazinophenylacetonitrile compounds according to claim 1 wherein the said groups are selected to give the compound α(4′-β-3″,4″,5″-trimethoxy-benzoxyethyl-piperazino[1′])-2,3,4-trimethoxy-phenylacetonitrile, and the dihydrochloride thereof.

6. α-Piperazinophenylacetonitrile compounds according to claim 1 wherein the said groups are selected to give the compound α(4′ - γ-3″,4″,5″-trimethoxy-benzoxypropyl-piperazino[1′])-2,3,4-trimethoxy-phenylacetonitrile, and the dihydrochloride thereof.

References Cited

UNITED STATES PATENTS 2,952,681  9/1960  Dodson _____ 260—268

DONALD G. DAUS, Primary Examiner

U.S. Cl. X.R.

260—268R; 424—250